United States Patent [19]

Pelekis

[11] 4,432,314
[45] Feb. 21, 1984

[54] INTERNAL COMBUSTION ENGINE

[75] Inventor: Emmanouil A. Pelekis, Athens, Greece

[73] Assignee: General Supply (Construction) Co., Ltd., Athens, Greece

[21] Appl. No.: 326,478

[22] Filed: Dec. 2, 1981

Related U.S. Application Data

[62] Division of Ser. No. 180,309, Aug. 22, 1980, Pat. No. 4,321,897.

[51] Int. Cl.³ .............................................. F02B 53/08
[52] U.S. Cl. .................................................... 123/238
[58] Field of Search ............................ 60/39.6, 39.63; 123/238, 234, 236, 237, 90.14; 137/528

[56] References Cited

U.S. PATENT DOCUMENTS

| | | | |
|---|---|---|---|
| 1,062,999 | 5/1913 | Webb | 60/39.6 X |
| 1,112,844 | 10/1914 | Schnitter | 60/39.6 |
| 1,251,132 | 12/1917 | Taylor | 123/223 |
| 2,062,753 | 12/1936 | Linn | 123/238 |
| 2,509,839 | 5/1950 | Panner | 137/528 X |
| 2,788,777 | 4/1957 | Clark | 123/90.14 X |
| 3,183,661 | 5/1965 | Peterson | 123/90.14 X |
| 4,023,349 | 5/1977 | Warren | 60/39.6 |
| 4,125,126 | 11/1978 | Davis | 137/528 X |

FOREIGN PATENT DOCUMENTS

| | | |
|---|---|---|
| 330231 | of 0000 | Fed. Rep. of Germany . |
| 1114534 | of 0000 | Fed. Rep. of Germany |
| 1450558 | 12/1968 | Fed. Rep. of Germany ...... 137/528 |
| 1301955 | of 0000 | France . |
| 1275103 | of 0000 | United Kingdom . |

*Primary Examiner*—Michael Koczo
*Attorney, Agent, or Firm*—Finnegan, Henderson, Farabow, Garrett & Dunner

[57] ABSTRACT

Internal combustion engine includes a rotary oxidizing gas compressor, a constant volume combustion chamber with pneumatically controlled intake and exhaust valves and a fuel injector, and a rotary combustion gas expander. Each of the rotary compressor and rotary expander has a pair of tangential rotors dependently rotatable in a housing, one rotor having a vane and the other a notch for allowing passage of the vane, to form a fluid tight segmented annular region through which the vane moves. The respective one of the intake valve and the exhaust valve admits a mass of high pressure compressible fluid to the region through a triangular port for expansion or from the region after compression, the mass of fluid being confined in a part of the region between the vane and the surface of the notched rotor and changing in pressure because of the change in arcuate length and volume of the confined part. The respective pairs of rotors are included on the same respective shafts. Two vanes may be included on the one rotor and two notches on the other. Two vaned rotors may cooperate with one notched rotor, the vaned rotors being on separate shafts.

17 Claims, 21 Drawing Figures

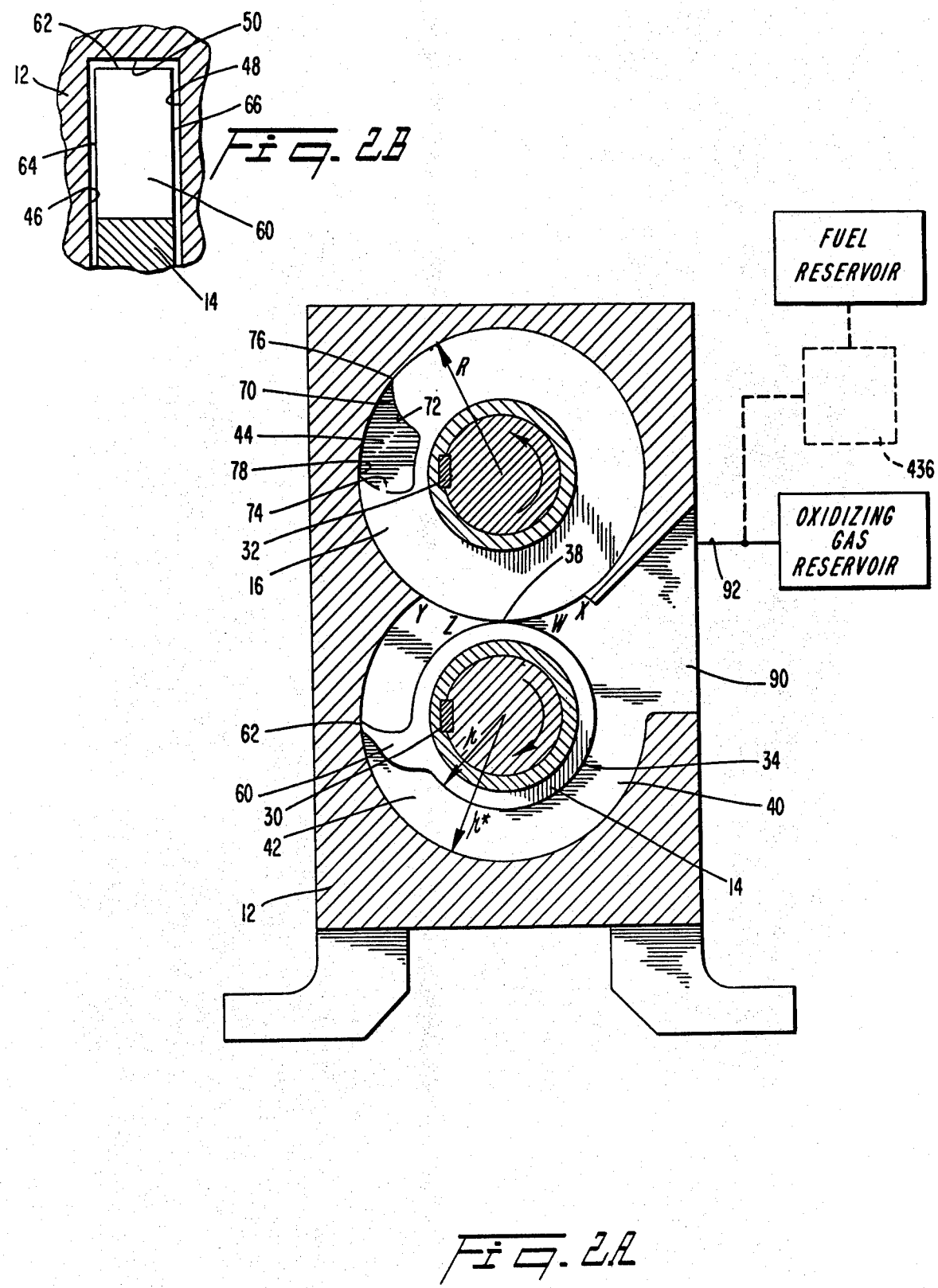

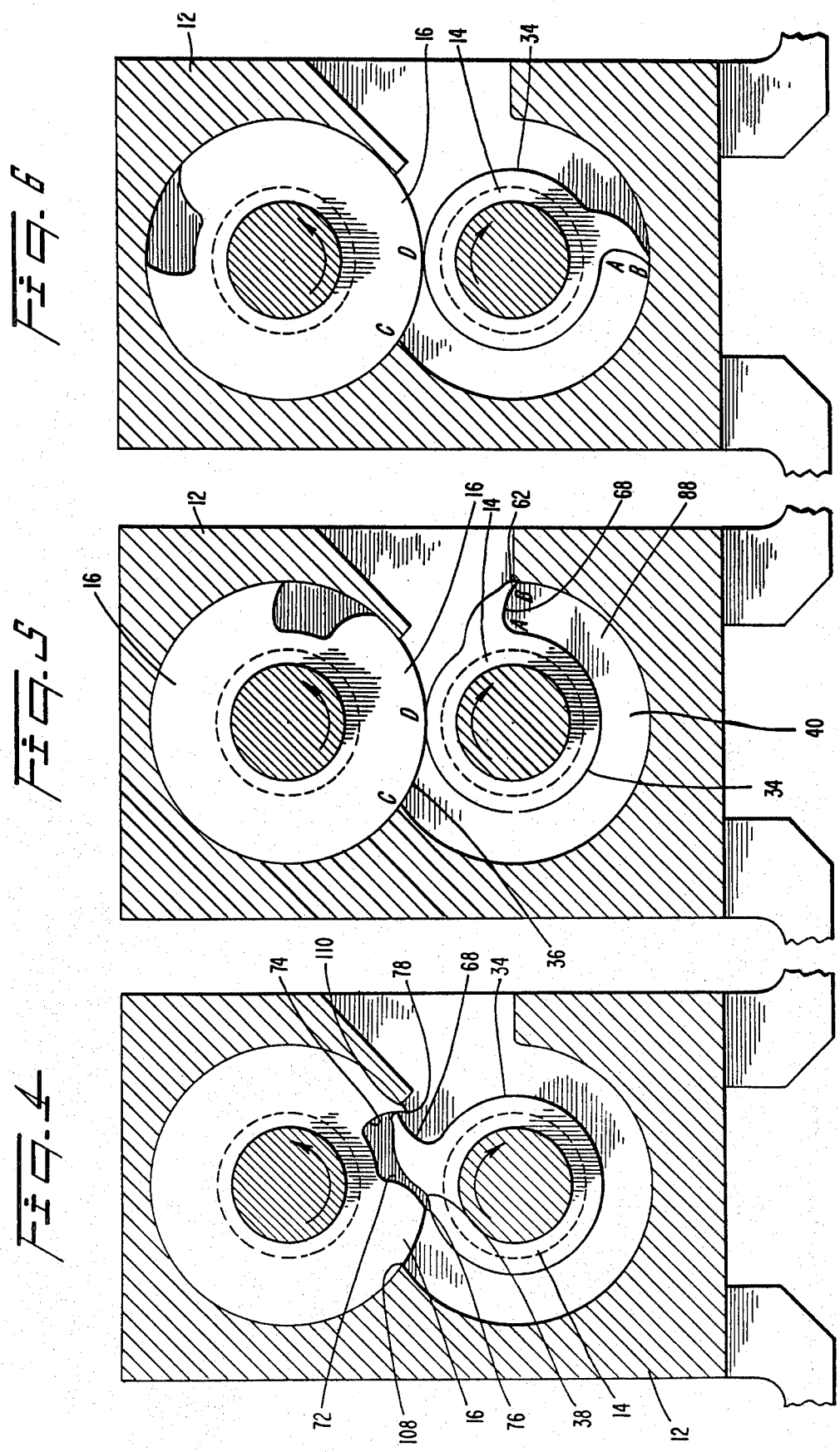

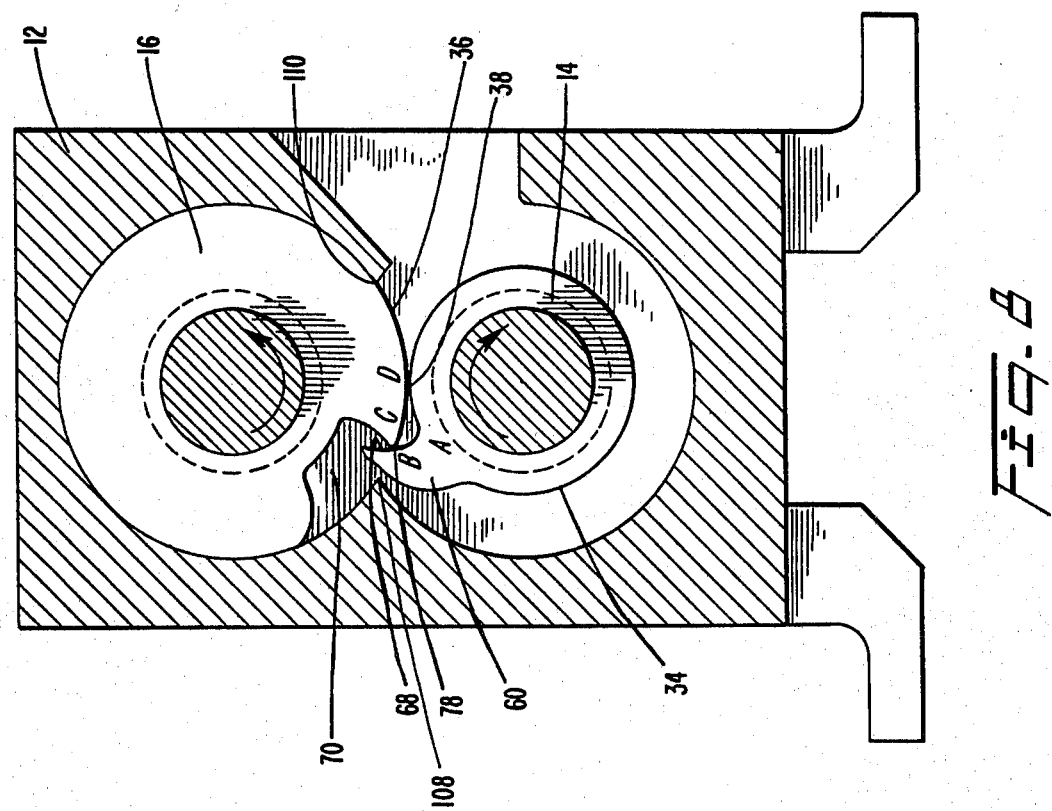
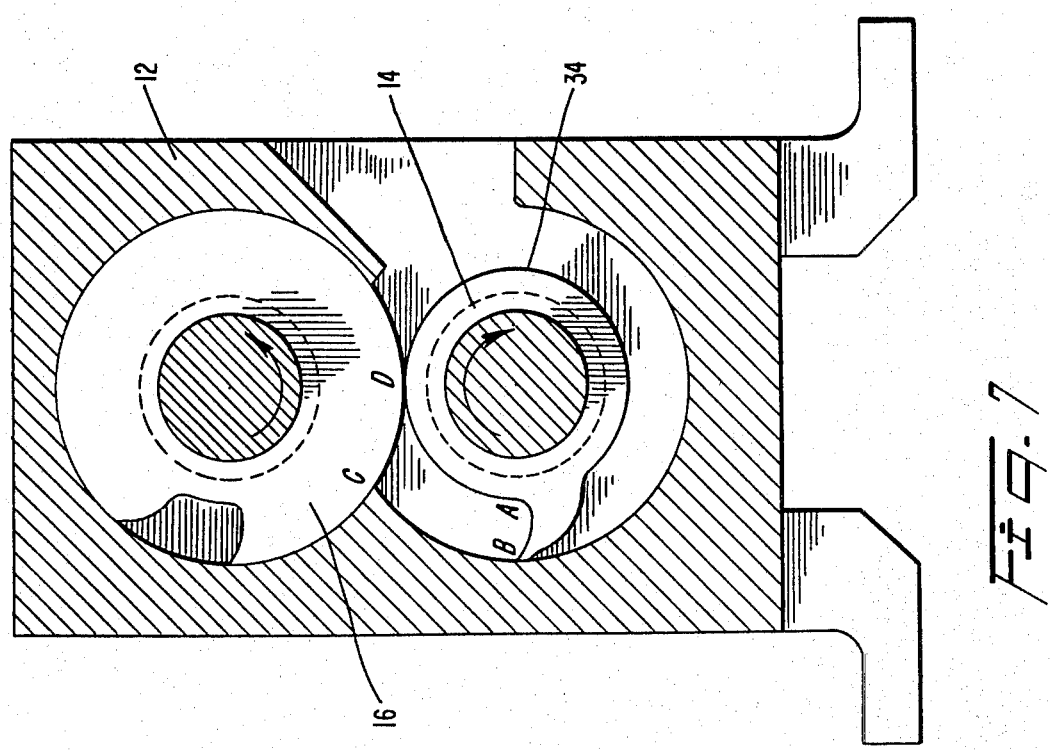

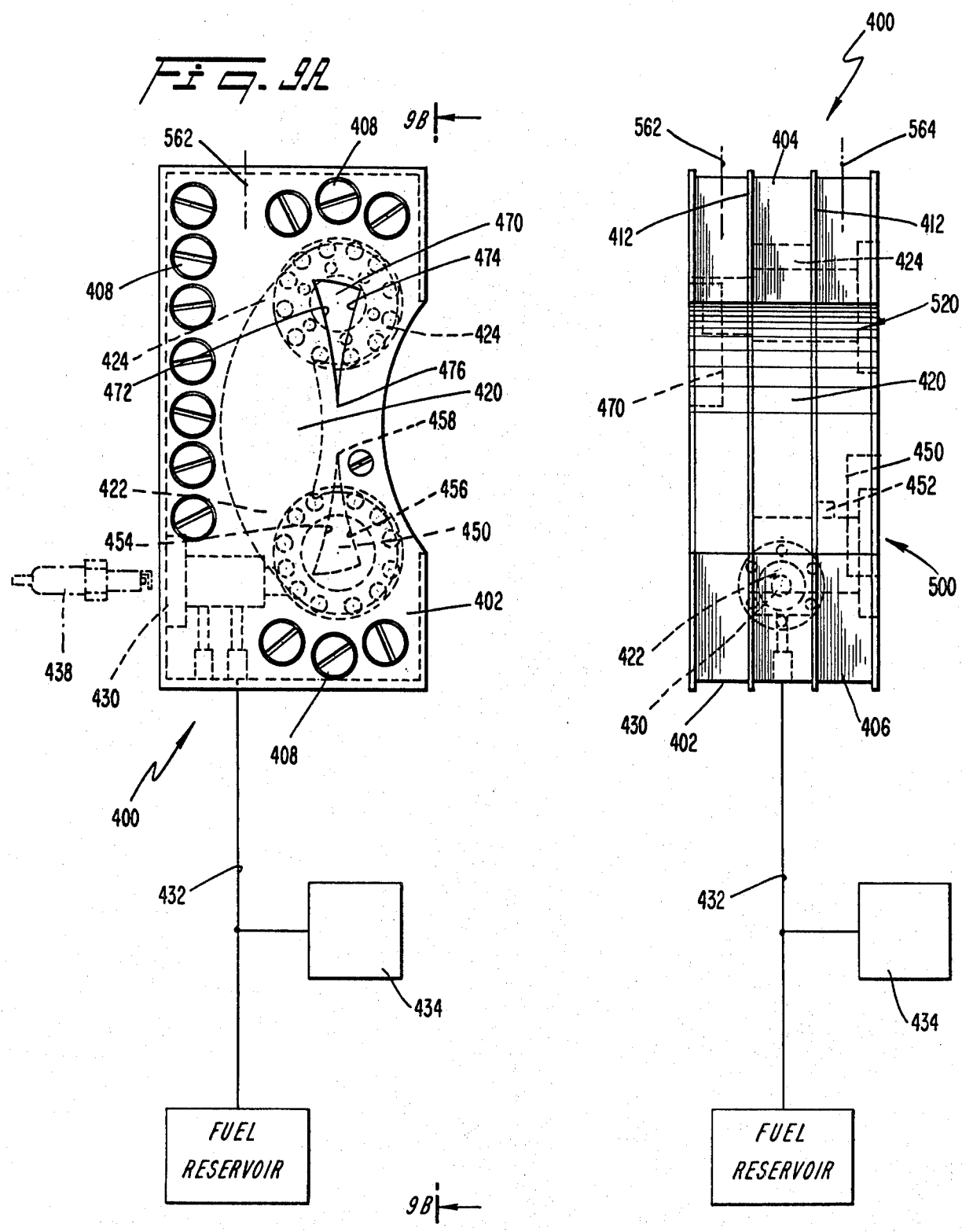

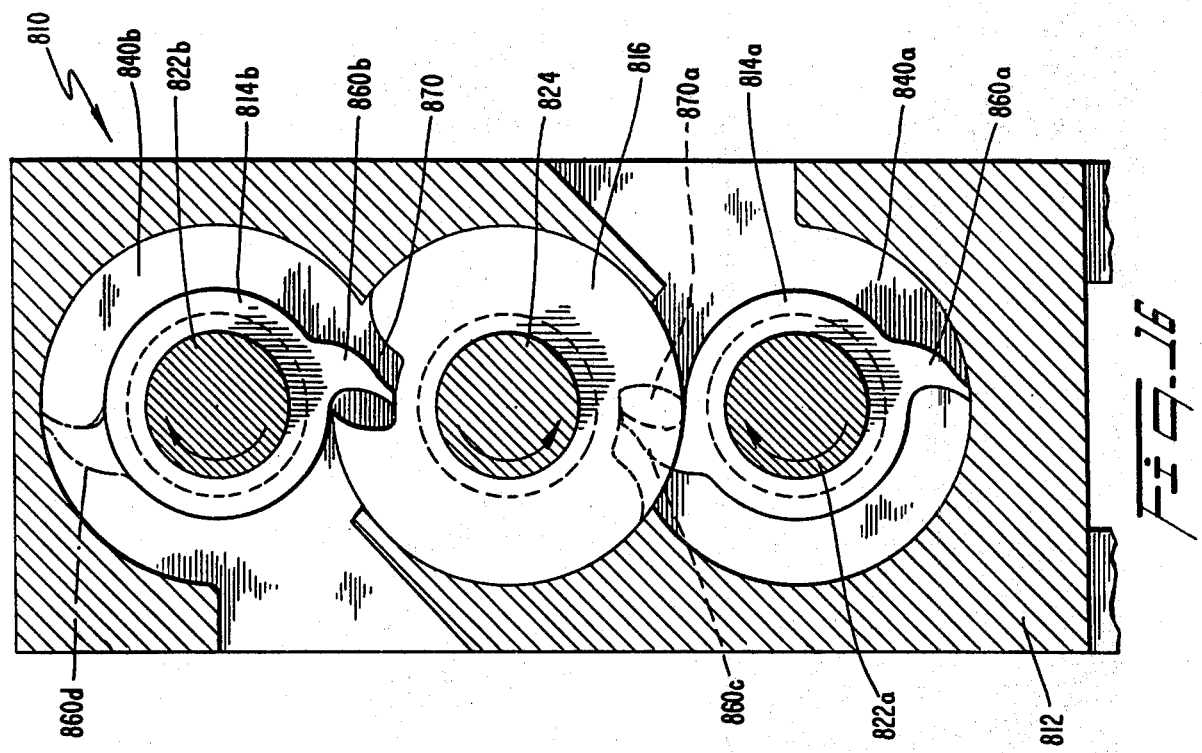
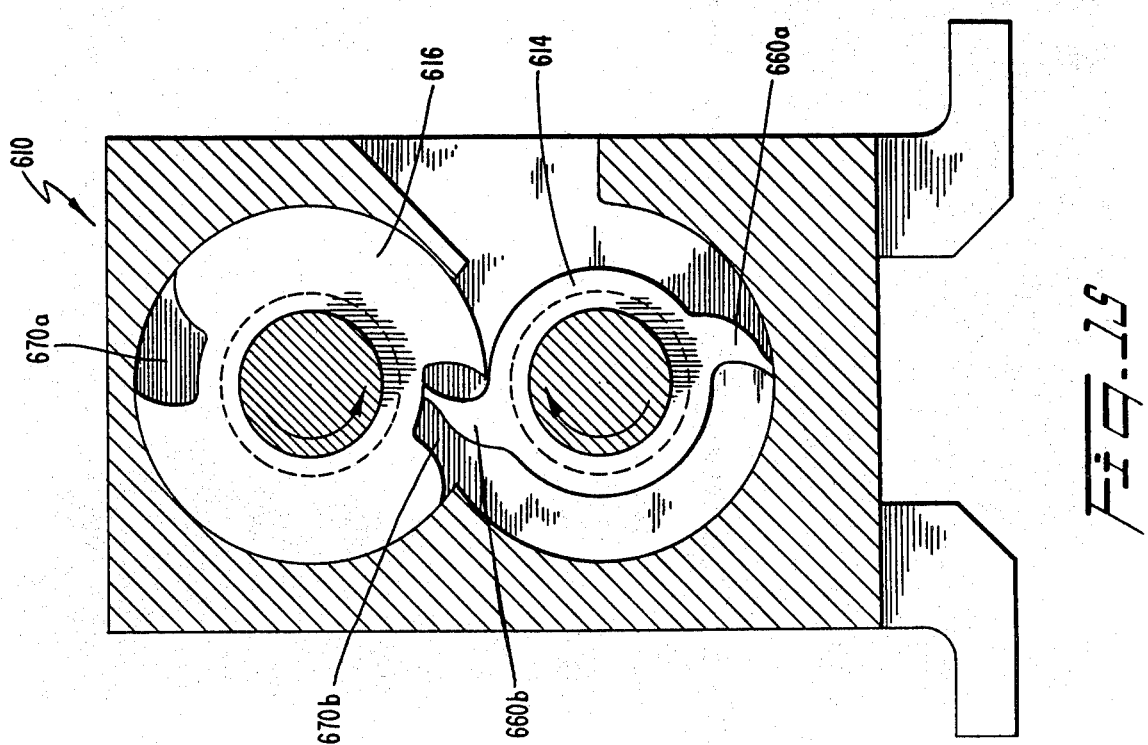

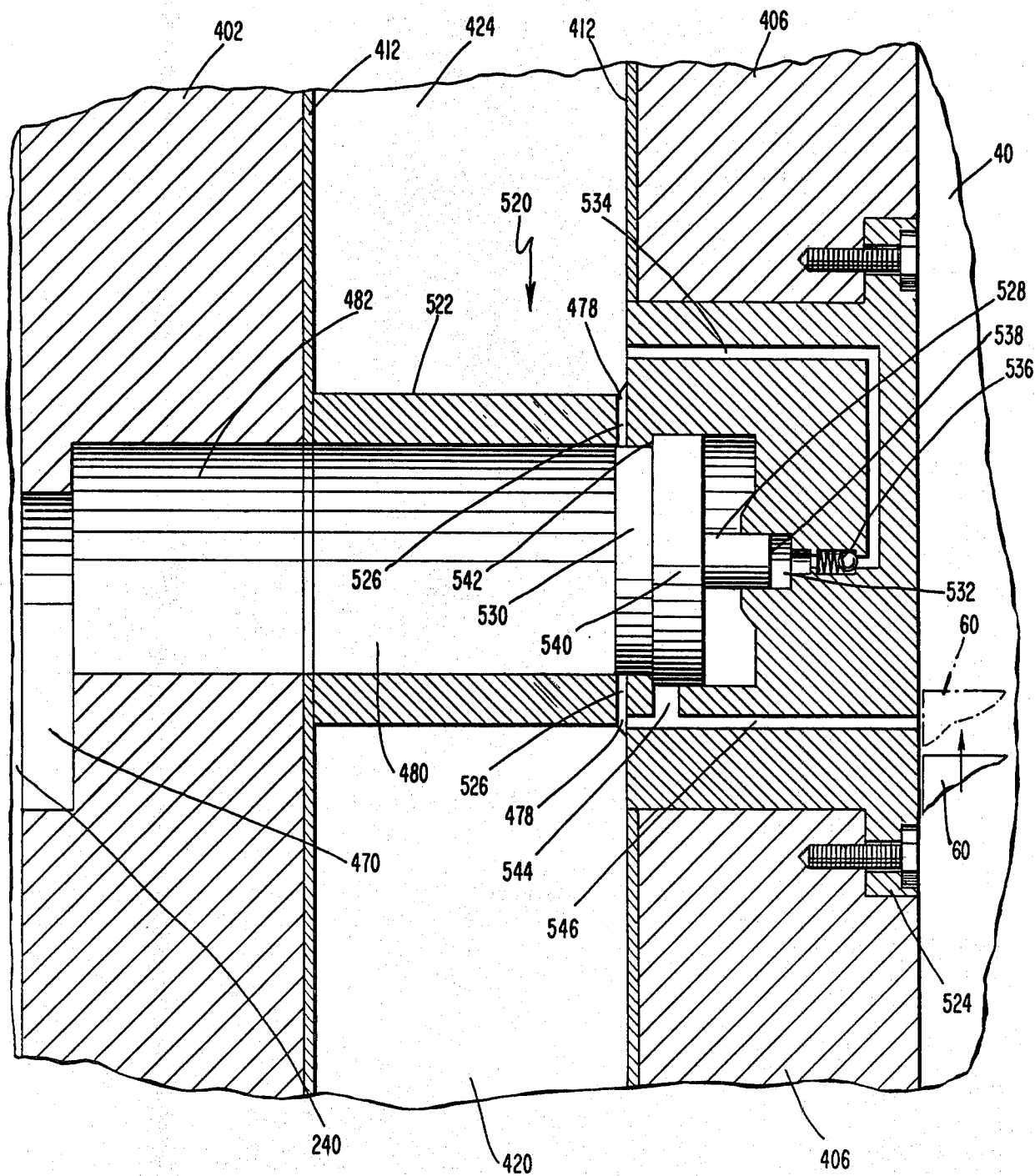

INTERNAL COMBUSTION ENGINE

This is a division of application Ser. No. 180,309, filed Aug. 22, 1980, now U.S. Pat. No. 4,321,897.

BACKGROUND OF THE INVENTION

1. Field of the Invention

This invention relates to apparatus of the rotary type useful for internally combusting a fuel with a compressible oxidizing fluid such as air to produce combustion gases. In a preferred embodiment, work is derived from the combustion gases.

2. Description of the Prior Art

The relevant prior art relating to internally combusting a fuel with a compressible oxidizing fluid includes at least the reciprocating and rotary internal combustion engine art.

SUMMARY OF THE INVENTION

In accordance with the purpose of the invention, as embodied and broadly described herein, the apparatus of this invention for combusting fuel with a compressible oxidizing gas to produce combustion gases comprises compressor means for increasing the pressure of the oxidizing gas; a housing having at least one chamber for combustion situated therein, and further including (i) intake means communicating with the compressor means for admitting to the chamber the compressed oxidizing gas and (ii) exhaust means for releasing combustion gases from the chamber; expander means communicating with the exhaust means for decreasing the pressure of the combustion gases, wherein at least one of the compressor means and the expander means includes cooperating rotor means for forming a gas-tight region in the shape of a segment of an annulus, a portion of the annulus being separately confineable, the volume of the region portion being variable only in the tangential direction, the pressure within the region portion changing when the volume of the region portion is varied; and means for introducing fuel into the combustion chamber for combustion with the compressed oxidizing gas.

Preferably, the cooperating rotor means includes a group of tangential rotors of circular cross section rotatable in the housing, the region being formed in the housing adjoining the peripheral surface of one of the rotors, the segmented annular region terminating at each end at the peripheral surface of another of the rotors; at least one vane on the peripheral surface of the one rotor, the outer extremities of the vane sealingly engaging the opposing surfaces of the annular region; vane relief means in the peripheral surface of the another rotor and shaped for receiving the vane during rotation of the vane past the another rotor, the vane and the vane relief means being in sealing relationship for at least part of the period when the vane is received in the vane relief means; and valve means for intermittently interrupting communication between the region and the combustion chamber.

It is further preferred that both the expander means and the compressor means have cooperating rotor means having respective first and second rotors with respective vane members and vane relief means in the form of notches, wherein each of the respective vane members has a vane face directed toward the respective confined region portion and each of the respective notches has an edge formed with the respective second rotor peripheral surface, and wherein the profile of said face corresponds to the path traced on the respective vane member by the respective edge during concurrent rotation of the respective first and second rotors.

It is still further preferred that the first compressor rotor and the first expander rotor are fixed to a first shaft and the second compressor rotor and the second expander rotor are fixed to a second shaft, the first and second shafts being parallel and rotatably mounted in the housing, and that the apparatus further comprises means for coupling the first and second shafts for providing dependent rotation in opposite angular directions and registration of the respective vanes and notches.

And it is still further preferred that the combustion chamber has a constant volume and is positioned in a plane lying between the respective planes of rotation of the first compressor rotor and the first expander rotor, the combustion chamber being positioned approximately axially in line with at least one of the respective segmented annular regions, the axial direction being defined by the rotor axes.

The accompanying drawing which is incorporated in, and constitutes a part of, this specification, illustrates several embodiments of the invention, and together with the description, serves to explain the principles of the invention.

BRIEF DESCRIPTION OF THE DRAWING

FIG. 2A is a sectional view taken along the line 2A—2A of the apparatus shown in FIG. 1, and FIG. 2B is a detail of a part of the apparatus shown in FIG. 2A;

FIGS. 4–8 correspond to the view of FIG. 2A but at different operational positions of the apparatus;

FIG. 9A is a sectional view of part of the apparatus shown in FIG. 1 taken along the line 9A—9A, and FIG. 9B is a view of the apparatus part shown in FIG. 9A taken along the line 9B—9B;

FIG. 15 is a schematic view of a part of another embodiment of the present invention;

FIG. 16 is a sectional view of a part of yet another embodiment of the present invention;

FIG. 18 is a sectional view of yet another part of the apparatus shown in FIGS. 9A and 9B.

DESCRIPTION OF THE PREFERRED EMBODIMENTS

Reference will now be made in detail to the present preferred embodiments of the invention, examples of which are illustrated in the accompanying drawing.

Figure 1:
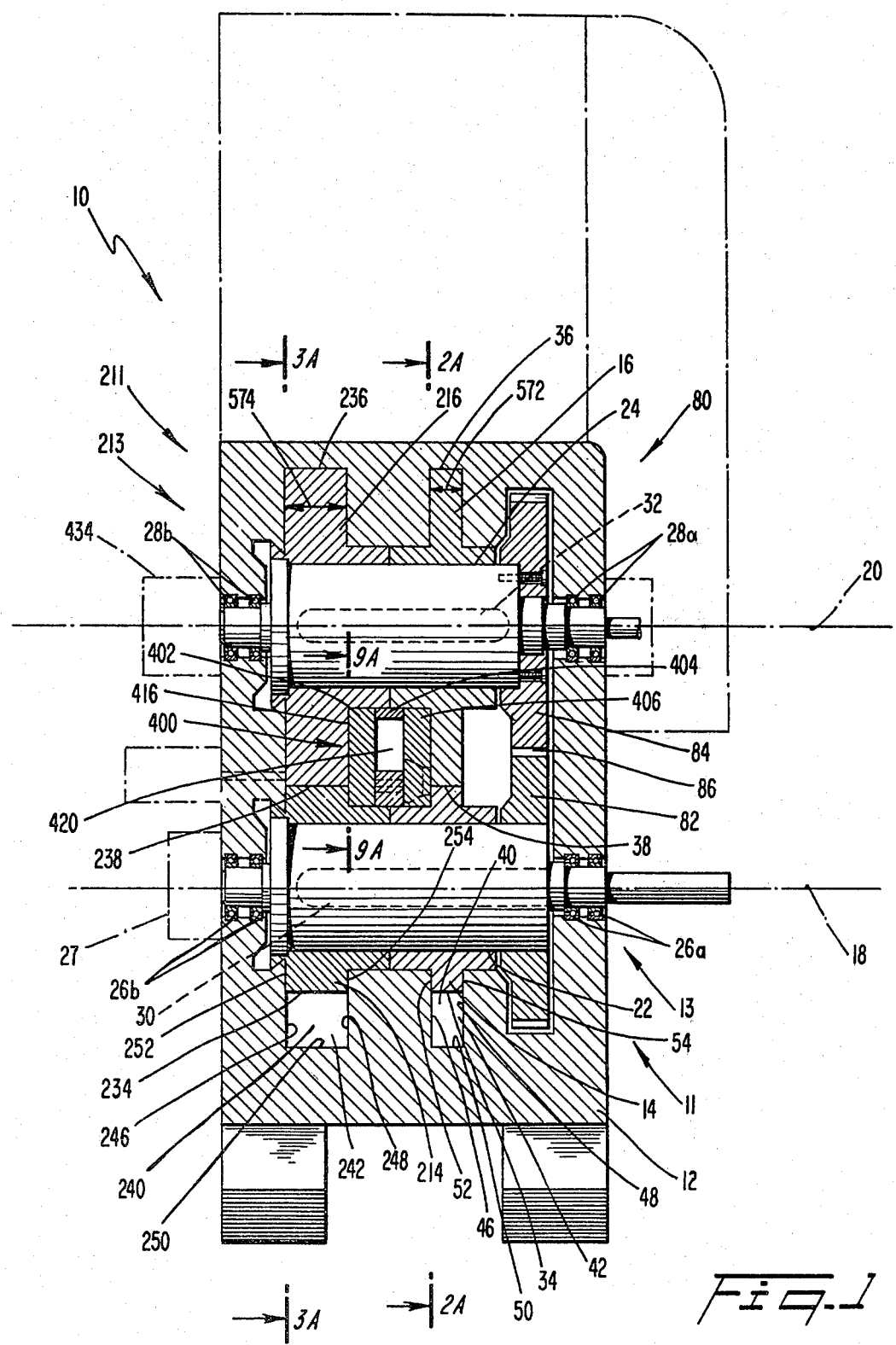
FIG. 1 is a sectional view of a schematic of one embodiment of apparatus for combusting fuel with a compressible oxidizing gas.

Referring now to FIG. 1, there is shown apparatus 10 for combusting fuel with a compressible oxidizing gas to produce combustion gases, apparatus 10 being made in accordance with the present invention. Apparatus 10 as shown in FIG. 1 is usable for combusting diesel fuel with air, but with only slight modifications readily apparent to one of ordinary skill in the art, could be used to combust gasoline with air or with another compressible oxidizing gas such as pure oxygen. With further modifications, again within the skill of one of ordinary skill in the art, apparatus 10 could be used for combusting other liquid fuels and gaseous fuels with a compressible oxidizing gas, and the scope of the present invention is not intended to be limited by the particular choice of fuel or oxidizing gas.

In accordance with the present invention, compressor means for increasing the pressure of the oxidizing gas is provided, the compressor means preferably including cooperating rotor means for forming a variable volume region for compression. As embodied herein and with particular reference to FIG. 2 apparatus 10 includes compressor means 11 in housing 12 including cooperating rotor means 13 having a first compressor rotor 14 and a second compressor rotor 16 positioned on parallel axes 18 and 20, respectively, for rotation in housing 12 in a tangential relationship. Preferably, the compressor rotors are mounted on respective shafts 22 and 24 which are journalled for rotation in bearing assemblies 26a, 26b and 28a, 28b which are mounted in housing 12. A lubrication system 27 for the bearings and gears 82 and 84 (to be discussed hereinafter) can be provided to be driven by one of the shafts, such as shaft 22 in FIG. 1. The compressor rotors 14 and 16 can be affixed to the respective rotating shafts 22 and 24 by any conventional means such as keys 30 and 32, respectively.

First compressor rotor 14 and second compressor rotor 16 have respective peripheral surfaces 34 and 36 which are closely adjacent at the line of tangency 38. For reasons that will become apparent in the succeeding discussion, the line of tangency 38 should be fluid-tight. This can be accomplished in any of a number of ways easily understood by one of ordinary skill in the art, including spacing axes 18 and 20 such that only a running clearance is establis.hed between peripheral surfaces 34 and 36 at the line of tangency 38, while providing substantially no leakage in the tangential direction past line 38.

In accordance with the invention, there is further provided a fluid-tight compressor region formed in the housing adjoining the peripheral surface of one of the compressor rotors, the region being in the shape of a segment of an annulus terminating at each end at the peripheral surface of the other compressor rotor. As embodied herein, and as best seen in FIG. 2A, a segmented annular region 40 is formed surrounding rotor 14. The boundaries of this region are designated in FIG. 2A by the letters WXYZ and include the peripheral surface 34 of rotor 14 as the inner annular boundary and the peripheral surface 36 of rotor 16 as the boundary for the segment ends of region 40 at W-X and Y-Z.

As can best be seen in FIG. 2A, compressor rotors 14 and 16 have radii r and R, respectively, and are disposed in overlapping circular cavities 42 and 44 in housing 12. Axes 18 and 20 of compressor rotors 14 and 16, respectively, coincide with the axes of the respective cavities 55 and are spaced approximately r+R apart, that is, enough to maintain a running clearance between the peripheral surfaces 34 and 36. As embodied herein, the radius of cavity 44 in which rotor 16 is disposed is approximately R, again to allow a running clearance, but the radius of cavity 42 in which rotor 14 is disposed has a radius r* which is significantly greater than the radius r of rotor 14, as is shown in FIG. 2A. In the embodiment shown in FIG. 2A, cavity 42 also has a radius of about R. As can be best seen in FIG. 1, cavity 42 includes opposing end walls with respective surfaces 46 and 48 and a peripheral wall with a surface 50 which, together with the peripheral surface 34 of rotor 14 and peripheral surface 36 of rotor 16 define segmented compressor annular region 40.

As will be understood by one of ordinary skill in the art reading the subsequent discussion, the space between cavity end wall surfaces 46 and 48 and the adjacent axial faces of compressor rotor 14, namely faces 52 and 54, must be of substantially fluid-tight in order to ensure the fluid tightness of region 40. Once again, this can be accomplished by spacing faces 52 and 54 from wall surfaces 46 and 48, respectively, a distance sufficient to provide a running clearance while providing a fluid seal. Or, sealing means (not shown) can be employed between the rotor faces and the adjacent end walls, as can be appreciated by one of ordinary skill in the art.

As further embodied herein, there is provided vane means on the peripheral surface of one of the compressor rotors, the extremities of the vane means sealingly engaging the opposing surfaces of the housing that bound the annulus. In the apparatus 10 as shown in FIGS. 2A and 2B, a single compressor vane member 60 is fixed to rotor 14 at the peripheral surface 34. Compressor vane member 60 has a radial extremity 62 which slidingly engages the peripheral surface 50 of housing 12 for providing a running seal. Axial extremities 64 and 66 of vane member 60 are similarly in sealing engagement with adjacent inner wall surfaces 46 and 48, respectively, for achieving sealing at the sides of vane member 60. As will be apparent to those of ordinary skill in the art, other means (not shown) can be used to effect the required running seals in place of the close fitting tolerances employed in the embodiment as shown in FIGS. 2A and 2B.

As still further embodied herein, there is provided relief means in the peripheral surface of the other of the compressor rotors, which relief means is shaped for receiving the vane means during rotation of the compressor rotors such as to allow the compressor vane means to pass the point of tangency of the compressor rotors. As best seen in FIG. 2A, a notch 70 is provided in compressor rotor 16, the notch having a maximum depth of at least $r^* - r$ to provide sufficient clearance for the passage of vane member 60. Notch 70 has opposing tangential sides 72 and 74 forming corresponding axially directed edges 76 and 78 at the intersection with the peripheral surface 36 of compressor rotor 16.

As further embodied herein, and as best seen in FIG. 1, means 80 including gears 82, 84 are provided for coupling the rotors for dependent rotation in opposite angular directions and for providing registration of the vane means and the vane relief means. In apparatus 10 shown in FIG. 1, gears 82 and 84 are fixed to shafts 22 and 24, respectively, and are in mating engagement at their line of tangency 86. Other means (not shown) for coupling compressor rotors 14 and 16 are possible, but gears 82 and 84 are preferred because they provide a positive registration of compressor vane member 60 with notch 70 such as is preferred to achieve the desired seal between the parts thereof, as will be explained henceforth.

Also as embodied herein, the compressor vane means and the compressor vane relief means are in sealing relationship for part of the period when the compressor vane means is received in the compressor vane relief means during rotation of the compressor vane means past the rotor with the compressor vane relief means. As best seen in FIG. 8, vane member 60 has a tangentially directed vane face 68 which is generally concave inward in shape. The precise radial profile of vane face 68 corresponds to the path of edge 78 of notch 70 on the vane member 60 during concurrent rotation of compressor rotors 14 and 16. Such a profile is easily understandable by one of ordinary skill in the art, and metal forming and cutting techniques and machinery are available to those skilled in the art for forming such a profile.

Again referring to FIG. 8, and with respect to the direction of rotation of compressor rotors 14 and 16 as indicated by the arrows, registration between the vane member 60 and the notch 70 is established by gears 82 and 84 such that edge 78 of notch 70 contacts the outermost portion of face 68 at extremity 62 when edge 78 passes the point 108 on housing 12 and subsequently rides down the face 68 until it approaches peripheral surface 34 at about the line of tangency 38. During this period the engagement between edge 78 and face 68 is a fluid-sealing engagement. One of ordinary skill in the art would realize that sealing means (not shown) could be utilized to effect the required seal between edge 78 and vane face 68 in an alternate construction.

During the other portion of the engagement of compressor vane member 60 with notch 70, that is, from a position prior to that shown in FIG. 4, that is, after edge 78 reaches the point of tangency and before it reaches point 110 on housing 12, vane extremity 62 can slide along notch side 74. The tangential side 74 of notch 70 has essentially the same profile shape as vane face 68 to prevent interference with the vane extremity 62. The profile of notch side 74 thus corresponds to the path traced by vane extremity 62 from a radius $R-(r^*-r)$ to a radius R on compressor rotor 16. While the profile of notch side 74 is similar to the profile of vane face 68, a fluid sealing engagement is not required between notch side 74 and compressor vane extremity 62, thereby permitting larger tolerances in the dimensions of notch side 74.

As further embodied herein, a path is provided in the housing 12 for flow into the segmented compressor annular region 40 of the uncompressed oxidizing gas. With respect to FIG. 2A, a compressor inlet port 90 is provided in the wall of housing 12 communicating directly with region 40. Port 90 and conduit 92 connect region 40 with a compressible oxidizing gas reservoir which can be the atmosphere in cases wherein apparatus 10 is using air for combustion. Port 90 is shown radially directed with respect to the axis of compressor rotor 14, but it can also be formed to communicate with region 40 in the axial direction such as through one of the end walls of cavity 42. Also, the shape of port 90 can be determined as a matter of convenience and/or to increase the efficiency of the overall process as would be well known to those of ordinary skill in the art of fluid flow.

Operation of the compressor means 11 of apparatus 10 will now be explained with reference to FIGS. 5–8. Turning first to FIG. 5, after vane extremity 62 has passed inlet port 90, a mass of low pressure oxidizing gas is trapped and confined in portion 88 of segmented annular region 40 designated ABCD, that is, the portion bounded by peripheral surface 36 of rotor 16, vane face 68, peripheral surface 34 of rotor 14, and the respective opposing end walls of cavity 42. FIGS. 6–8 show rotors 14 and 16 at subsequent angular positions wherein the region portion ABCD has successively decreased in volume due to the movement of vane member 60 with face 68 which leads in the tangential direction, thereby decreasing the arcuate length of the volume contained within the region portion ABCD, namely, confined portion 88. FIG. 8 shows the rotors at the completion of the compression cycle where the vane member 60 has been received within notch 70 when the compressed oxidizing gas is ready to be released from the portion ABCD of segmented annular region 40 as will be discussed hereinafter.

During the compression cycle, the pressure of the oxidizing gas trapped in the region portion ABCD is increasing due to the decrease in volume of ABCD. Also, as the trapped oxidizing gas is continually acting against the moving vane face 68, an input of energy is required in the form of a torque on the compressor rotor 14 which can be obtained elsewhere but which is best obtained from apparatus 10 as will be evident from the discussion.

Further in accordance with the invention, there is provided expander means for decreasing the pressure of the combustion gases, preferably also having cooperating rotor means. As embodied herein, and with reference to FIG. 1, expander means 211 includes expander cooperating rotor means 213 having a pair of tangential rotors of circular cross section, namely 214 and 216, rotatable in housing 12. Preferably, the first expander rotor 214 and second expander rotor 216 are mounted on the same shafts 22 and 24 on which compressor rotors 14 and 16 are mounted, respectively. The expander rotors 214 and 216 can be affixed to the respective rotating shafts 22 and 24 by any conventional means including the same keys 30 and 32 used to affix compressor rotors 14 and 16, respectively.

First expander rotor 214 and second expander rotor 216 have peripheral surfaces 234 and 236 which are closely adjacent at the line of tangency 238. As was discussed for the corresponding compressor elements, the line of tangency 238 should be fluid-tight. This can be accomplished in any of a number of ways. In the embodiment shown in FIG. 1, the spacing of axes 18 and 20 is such that only a running clearance is established between peripheral surfaces 234 and 236 at the line of tangency 238, while providing substantially no leakage in the tangential direction past line 238.

Figures 3A, 3B:
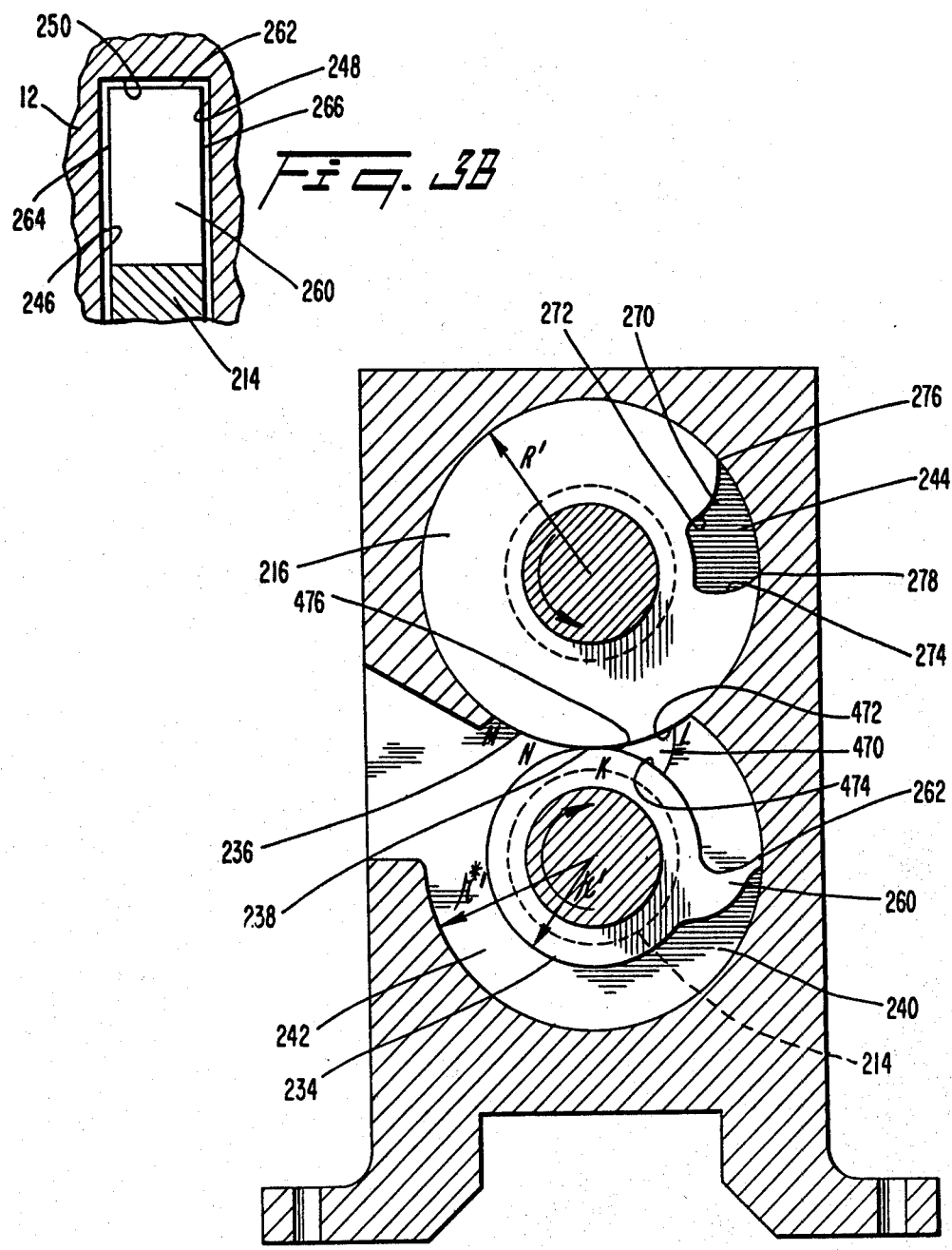
FIG. 3A is a sectional view taken along the line 3A—3A of the apparatus shown in FIG. 1.
FIG. 3B is a detail of a part of the apparatus shown in FIG. 3A.

In accordance with the invention, there is further provided a fluid-tight region formed in the housing adjoining the peripheral surface of one of the expander rotors, the region being in the shape of a segment of an annulus terminating at each end at the peripheral surface of the other expander rotor. As embodied herein, and as best seen in FIG. 3A, a segmented expander annular region 240 is formed surrounding rotor 214. The boundaries of this region are designated in FIG. 3A by the letters KLMN and include the peripheral surface 234 of expander rotor 214 as the inner annular boundary and the peripheral surface 236 of expander rotor 216 as the boundary for the segment ends of expander region 240 at K–L and M–N.

As can be best seen in FIG. 3A, expander rotors 214 and 216 have radii r' and R', respectively, and are disposed in overlapping circular cavities 242 and 244 in housing 12 in essentially the same fashion as the corresponding compressor rotors 14 and 16 and compressor cavities 42 and 44. The spacing of axes 18 and 20 which coincide with the axes of the respective expander cavities 242 and 244 is such as to maintain a running clearance between the peripheral surfaces 234 and 236. The radius of cavity 244 in which expander rotor 216 is disposed is approximately R', again to allow a running clearance, but the radius of cavity 242 in which expander rotor 214 is disposed has a radius r*' which is significantly greater than the radius r' of expander rotor 214, as shown in FIG. 3A. In the embodiment shown in FIGS. 1-14, cavity 242 also has a radius of about R'.

As can be best seen in FIG. 1, cavity 242 includes a second set of opposing end wall surfaces 246 and 248 and a peripheral wall surface 250 which, together with the peripheral surface 234 of expander rotor 214 and peripheral surface 236 of expander rotor 216 define the segmented expander annular region 240.

Again, the space between expander cavity end wall surfaces 246 and 248 and the adjacent axial faces of rotor 214, namely faces 252 and 254 (FIG. 1) must be substantially gas-tight in order to ensure the gas tightness of expander region 240. Once again, this can be accomplished by spacing faces 252 and 254 from wall surfaces 246 and 248, respectively, a distance sufficient to provide a running clearance while providing a fluid seal. Or, sealing means (not shown) can be employed between the expander rotor faces and the adjacent end walls.

As embodied herein, there is provided expander vane means on the peripheral surface of one of the rotors, the extremities of the expander vane means sealingly engaging the opposing surfaces of the housing that bound the expander annular region. As shown in FIGS. 3A and 3B, a single vane member 260 is fixed to expander rotor 214 at the peripheral surface 234. Expander vane member 260 has a radial extremity 262 which slidingly engages the peripheral surface 250 of housing 12 for providing a running seal. Axial extremities 264 and 266 of expander vane member 260 are similarly in sealing engagement with adjacent inner wall surfaces 246 and 248, respectively, for achieving sealing at the sides of vane member 260. Other means (not shown) can be used to effect the required running seals in place of the aforementioned closs-fitting tolerances.

Figure 10:
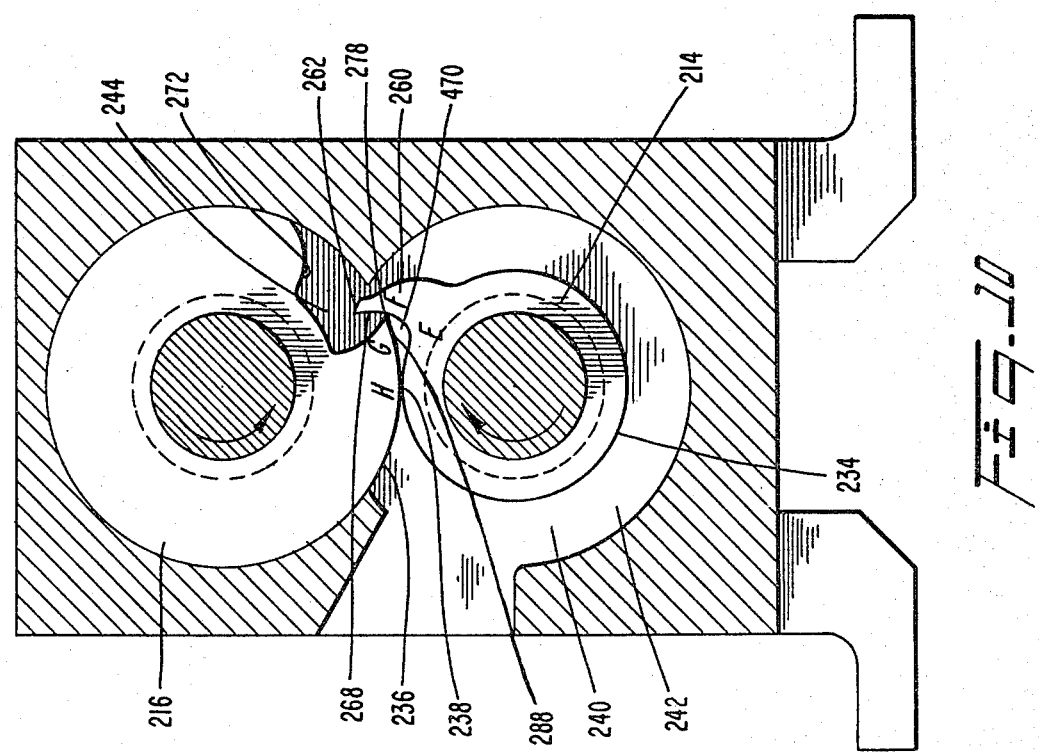

As further embodied herein, there is provided expander vane relief means in the peripheral surface of the other of the expander rotors, which expander vane relief means is shaped for receiving the expander vane means during rotation of the expander rotors to allow the expander vane means to Pass the point of tangency of the expander rotors. As best seen in FIG. 3A, notch 270 is provided in expander rotor 216, the notch having a maximum depth of at least $r^{*'}-r'$ to provide sufficient clearance for the passage of expander vane member 260. Notch 270 has opposing tangential sides 272 and 274 forming corresponding axially directed edges 276 and 278 at the intersection with the peripheral surface 236 of expander rotor 216. Gears 82 and 84 of coupling means 80 also provide for rotation of expander rotors 214 and 216 in opposite angular directions and for registration of expander vane 260 and notch 270. As with the corresponding compressor elements, and as embodied herein, the expander vane means and the expander vane relief means are in sealing relationship for part of the period when the expander vane means is received in the expander vane relief means during rotation of the expander vane means past the expander rotor having the expander vane relief means. As best seen in FIG. 10, expander vane member 260 has a tangentially directed vane face 268 which is generally concave inward in shape. The precise radial profile of expander vane face 268 corresponds to the path of notch edge 278 on the expander vane member 260 during concurrent rotation of expander rotors 214 and 216, as was explained in relation to compressor vane face 68.

Again referring to FIG. 10, and with respect to the direction of rotation of expander rotors 214 and 216 as indicated by the arrows, registration between the expander vane member 260 and the notch 270 is established such that edge 278 of notch 270 contacts the innermost portion of face 268 when edge 278 passes the line of tangency 238 and subsequently rides up along the face 268 until it passes and clears extremity 262 of expander vane member 260. During this period, sliding engagement between edge 278 and face 268 is a gas-sealing engagement. Sealing means (not shown) could be utilized to effect the required seal in an alternate construction.

Figure 14:
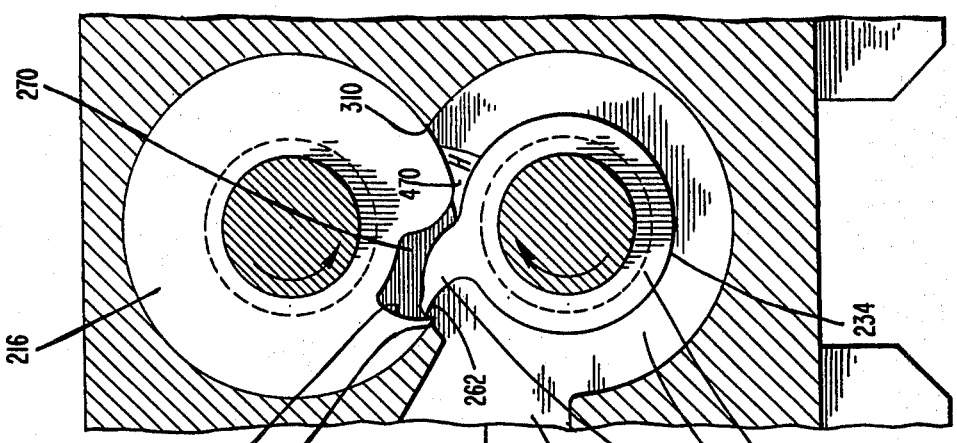

During the other portion of the period of engagement of expander vane member 260 with notch 270, that is, from a position such as shown in FIG. 14 before edge 278 reaches the point of tangency, expander vane extremity 262 can slide along notch side 274. The tangential side 274 of notch 270 has essentially the same profile shape as vane face 268 to prevent interference with the vane extremity 262. The profile of notch side 274 thus corresponds to the path traced by expander vane extremity 262 from a raidus R' to a radius $R'-(r^{*'}-r')$ on expander rotor 216. While the profile of notch side 274 is similar to the profile of vane face 268, a gas sealing engagement is not required between notch side 274 and vane extremity 262, thereby permitting larger tolerances in the dimensions of notch side 274.

Operation of the expander portion of the apparatus 10 made in accordance with the present invention will now be explained with reference to FIGS. 10-14. Turning first to FIG. 10, when the notch edge 278 has passed the line of tangency 238 and is in sliding engagement with expander vane face 268, a mass of combustion gases at high pressure is admitted into the portion 288 of segmented expander annular region 240 designated EFGH, that is, the portion bounded by peripheral surface 236 of rotor 216, expander vane face 268, peripheral surface 234 of rotor 214, and the respective opposing end walls of cavity 242.

FIGS. 11-14 show expander rotors 214 and 216 at subsequent angular positions wherein the region portion EFGH successively increases in volume due to the movement of vane member 260 with face 268 which trails in the tangential direction, thereby increasing the arcuate length and thus the volume of region portion 288, that is, EFGH.

FIG. 14 shows the rotors at the completion of the expansion cycle where the expander vane member 260 has been received within notch 270 after the expanded combustion gases have been released from the segmented expander annular region 240 through low pressure expander port 290, through conduit 292 and to the combustion gas reservoir which can be the atmosphere.

During the expansion cycle, the pressure of the mass of expansible combustion gases being trapped in the region portion EFGH is decreasing due to the increase in volume of EFGH. Also, as the trapped expansible combustion gases are continually acting against the moving vane face 268, it is possible to extract energy from the trapped gas in the form of a torque on the expander rotor 214 which can be utilized elsewhere, such as for providing the necessary energy to drive compressor rotor 14 to compress the oxidizing gas. Due to the net input of energy to apparatus 10 in the form of fuel, which energy is liberated as heat energy during the combustion as will be described hereinafter, a net positive production of energy or work is feasible using apparatus 10.

It is also apparent from a review of the operation of the apparatus 10 shown in FIGS. 4-8 that there are two points of the compression cycle wherein the edge 78, compressor vane extremity 62 and the peripheral surface 50 of cavity 42 are virtually coincident, namely at points 108 and 110 as depicted in FIG. 4. Proper orientation and registration between edge 78 and extremity 62 at these points is provided by the dependent rotation and positive registration afforded by gears 82 and 84 shown in FIG. 1. As can be appreciated from FIGS. 10-14, there are also two points of the expansion cycle wherein the edge 278, expander vane extremity 262 and the peripheral surface 250 of cavity 242 are virtually coincident, namely at points 308 and 310 as depicted in FIG. 14. Proper orientation and registration between edge 278 and extremity 262 at these points is also provided by the dependent rotation and positive registration provided by gears 82 and 84.

From the preceding discussion it should be apparent that basically the same principles and apparatus components function in apparatus 10 to achieve the compression of the oxidizing gas and expansion of the combustion gases. The predominant difference between the respective parts of apparatus 10 are in the direction of rotation of the respective rotors with respect to the orientation of the respective confining vane face; that is, vane face 68 leads the compressor vane member 60 in the direction of rotation while the vane face 268 of the expander trails the associated expander vane member 260 in the direction of rotation. Other differences will be apparent to those skilled in the art, such as the use of appropriate materials to withstand the generally higher temperatures prevailing in the expander due to the elevated temperature of the combustion gases.

Further in accordance with the present invention, there is provided in the housing at least one chamber for combustion of the fuel with the compressed oxidizing gas. As embodied herein, and with particular reference to FIGS. 9A and 9B, there is shown a sub-housing 400 for mounting in housing 12 having three stacked plate members 402, 404 and 406 as shown joined together by a plurality of machine screws 408, although any other suitable fastening means could be employed. Relatively thin shim plates 412 are positioned between the inner plate 404 and the outside plates 402 and 406 to provide a gas-tight seal as is conventional.

As can best be seen in FIG. 9A, the interior of plate member 404 has a generally elongated, ellipsoidal cavity 420 formed therein with enlarged cavity end portions 422 and 424 which constitute the chamber wherein combustion of the fuel and compressed oxidizing gas is initiated, as will be detailed hereinafter.

In one preferred embodiment of the present invention, a fuel having an ignition temperature lower than the temperature of the compressed oxidizing gas is injected directly into the combustion chamber 420, 422 and 424 through a fuel injector 430 fed from a fuel reservoir through fuel conduit 432. As is conventional, apparatus 434 can be provided to power the fuel injection system, which apparatus can be driven from a conventional power takeoff of one of the shafts holding the compressor rotors 14 and 16 and expander rotors 214 and 216, such as shaft 24 in FIG. 1.

In an alternate embodiment, a fuel can be employed having an ignition temperature greater than the temperature of the compressed oxidizing fluid which is admitted to the combustion chamber 420, 422 and 424. In this alternate construction, means such as conventional carburetion system 436 can be employed to mix the fuel from the fuel reservoir with the uncompressed oxidizing gas flowing to the compressor through conduit 92, as is depicted in FIG. 2A. In this construction, and with reference to FIG. 9A, the fuel injection apparatus 430 is replaced with a means for igniting the compressed mixture of fuel and air which is admitted to the combustion chamber 420, 422 and 424 from the compressor, a conventional spark plug 438 being shown in line with the fuel injector 430 to represent such an ignition device. Such ignition systems are well known to those skilled in the art and the ancillary requirements of such are readily understood.

Further in accordance with the present invention, intake means are provided for communicating with the compressor means. for admitting to the combustion chamber the compressed oxidizing gas. As embodied herein, and as shown in FIGS. 9A and 9B, the intake means includes an intake port 450 formed in the outside surface of plate member 406 and communicating with a combustion chamber end section 422 through an annular flow passage 452 past intake valve 500 (which will be discussed hereinafter), as shown schematically in FIG. 17. Inlet port 450 is in the general shape of an elongated triangle with elongated sides 454 and 456 with an included vertex 458. Preferably, intake port sides 454 and 456 are concave inward with radii of curvature of R and r, respectively, for reasons which will be apparent from the succeeding discussion.

Further in accordance with the invention, exhaust means are provided for releasing combustion gases from the combustion chamber. As embodied herein, and with continued reference to FIGS. 9A and 9B and also FIG. 18, the exhaust means includes an exhaust port 470 formed in the outside surface of plate member 402. Exhaust port 470 is in the general shape of an elongated triangle, as was intake port 450, that is, having elongated sides 472 and 474 and included vertex 476. Again, as was the case with intake port 450, sides 472 and 474 of exhaust port 470 are concave inward with respective to radii of curvature R' and r'.

As embodied herein, the exhaust means for releasing combustion products from combustion chamber 420, 422, and 424 further includes flow paths 478 and 480 through exhaust valve 520 (described in detail hereinafter) and flow path 482 in outside plate member 402 connecting flow path 480 with exhaust port 470.

Communication between the combustion chamber 420, 422 and 424 and the respective segmented annular regions, namely segmented compressor annular region 40 and segmented expander annular region 240, will now be described. Turning first to FIG. 1, sub-housing 400 which includes combustion chamber 420 is positioned in a cavity 416 in housing 12 situated in a plane parallel to and between the plane of rotation of compressor rotors 14 and 16 and the plane of rotation of expander rotors 214 and 216. Sub-housing 400 including combustion chamber 420 is also situated between axes 18 and 20 on which shafts 22 and 24 turn, respectively. In the described position, and as shown in FIG. 1, the long axis of elongated combustion chamber 420, 422 and 424 is perpendicular to the plane of axes 18 and 20.

Sub-housing 400 is disposed in cavity 416 such that outside plate element 406 with intake port 450 formed therein faces the compressor rotors 14 and 16 and the other outside plate member 402 faces expander rotors 214 and 216. Preferably, sub-housing 400 is constructed so that the outside surfaces of the respective outside plate members 406 and 402 form part of the boundaries of the segmented compressor annular region 40 and segmented expander annular region 240, respectively. It is also preferred that the respective triangular-shaped intake port 450 and exhaust port 470 are positioned to border the segmented compressor annular region 40 and segmented expander annular region 240, respectively, at the convergence of the respective peripheral surfaces of the rotors on plate members 406 and 402.

With reference to FIG. 2A, intake port 450 communicates with the segmented compressor annular region 40 near the convergence of rotor 14 and rotor 16 just upstream of the point of tangency 38, with respect to the direction of rotation of rotors 14 and 16. Although the cross-sectional view of the apparatus 10 that is presented in FIG. 2A and FIG. 8 does not permit the showing of a representation of intake port 450, it will easily be understood that the vertex 458 of triangular intake port 450 is directed toward the line of tangency 38 and that the elongated intake port sides 454 and 456 are disposed essentially axially in line with the peripheral surface 36 of rotor 16 and peripheral surface 34 of rotor 14, respectively. It will also be appreciated from a review of FIG. 8 which shows approximately the final stage in the compression cycle, that the respective portions of vane face 68 and peripheral surfaces 36 and 34 which form the boundary of the compressed volume ABCD act to guide the flow of the compressed oxidizing gas into intake port 450, and that because of the similarity in shape between the intake port 450 and the compressed volume ABCD at this point, the pressure drops due to form losses are minimized.

In a similar fashion, and with reference to FIGS. 3A and 10, exhaust port 470 is shown positioned proximate the convergence of peripheral surfaces 236 and 234 with the vertex 476 of exhaust port 470 directed toward the convergence at the line of tangency 238 and the respective elongated curved sides 472 and 474 disposed axially in line with the respective peripheral surfaces 236 and 234. As was previously discussed with relation to intake port 450, and with reference to FIG. 10, the portions of the vane face 268 and peripheral surfaces 236 and 234 forming the confined region EFGH act to guide the high pressure combustion gases exiting the combustion chamber through exhaust port 470 into confined volume EFGH with a minimum of form losses.

Figure 17:
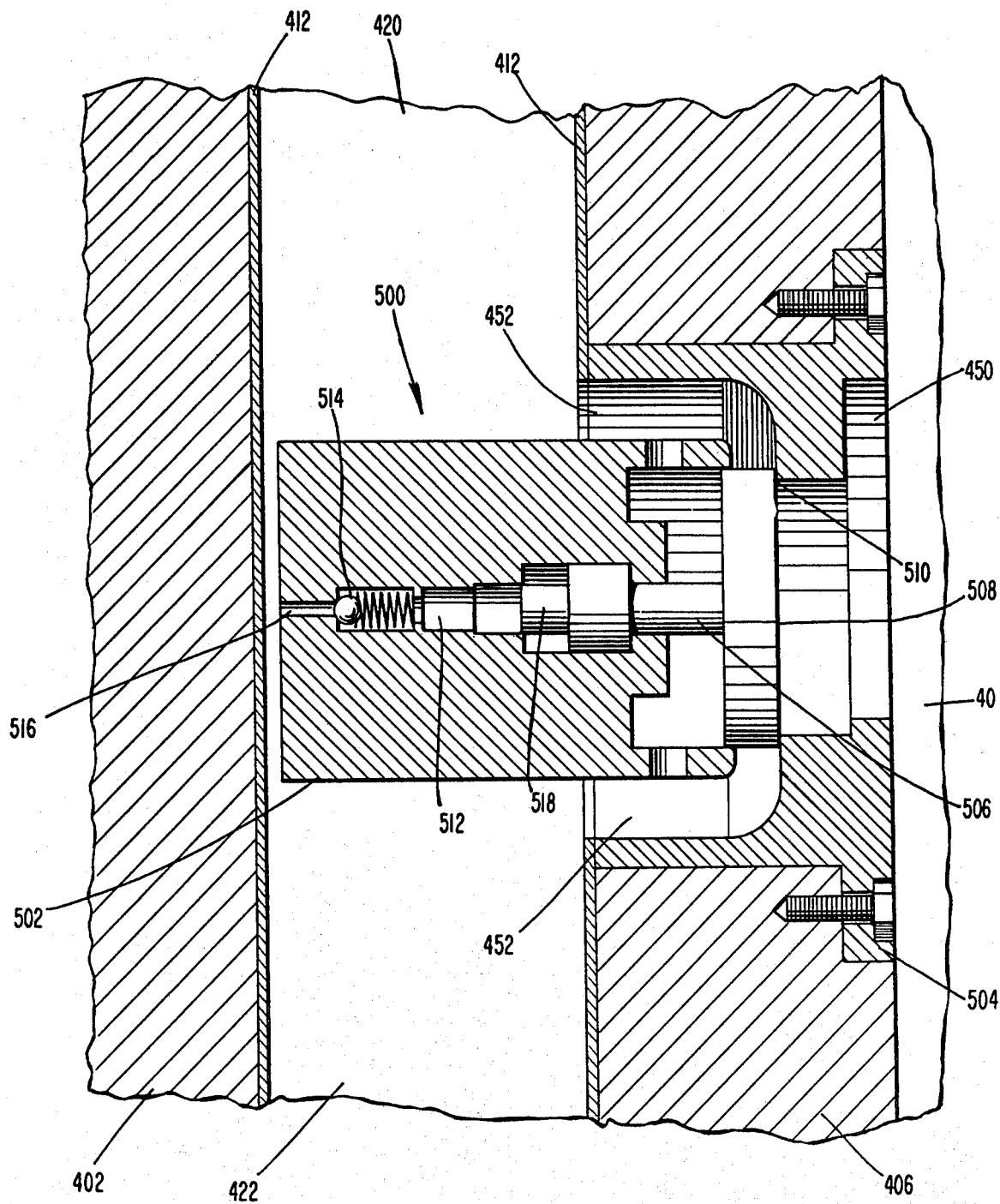
FIG. 17 is a sectional view of a part of the apparatus shown in FIGS. 9A and 9B.

The operation of the overall apparatus 10 will now be described in terms of the flow path through the various components of the machine. Beginning with the unpressurized oxidizing gas received from the reservoir, as is shown in FIG. 2A, gas passes through conduit 92 and into the compressor region through compressor inlet port 90 and into the segmented compressor annular region 40. Thereafter, it is trapped by the compressor vane 60 within the confinable portion 88 which is designated ABCD in FIG. 5 where it is compressed to the point shown in FIG. 8 by the rotation of the compressor vane 60. Thereafter, the compressed oxidizing gas flows from the confined volume ABCD in FIG. 8 through the intake port 450 (as is shown in FIG. 17) and thereafter through the annular flow passage 452 that surrounds the intake valve 500 (which will be discussed hereinafter).

The compressed oxidizing gas emanating from flow path 452 enters the combustion chamber 420 through the combustion chamber region 422 whereupon it is mixed with fuel injected through the fuel injector 430 (for the arrangement wherein a fuel having an ignition temperature lower than the temperature of the compressed oxidizing gas is being utilized; see FIGS. 9A and 9B). After combustion of the resulting fuel-compressed oxidizing gas mixture is initiated in the combustion chamber 420, 422, 424 the resulting combustion gases, as well as any uncombusted fuel and compressed oxidizing gas which may still be in the process of being combusted, exits the combustion chamber 420 through combustion chamber region 424. From combustion chamber region 424 the combustion gases flow through flow paths 478 and 480 which are disposed within the exhaust valve 520 (which will be discussed hereinafter) and then through flow path 482 in outside plate member 402 and finally to the exhaust port 470 (see FIG. 18).

Figure 11:
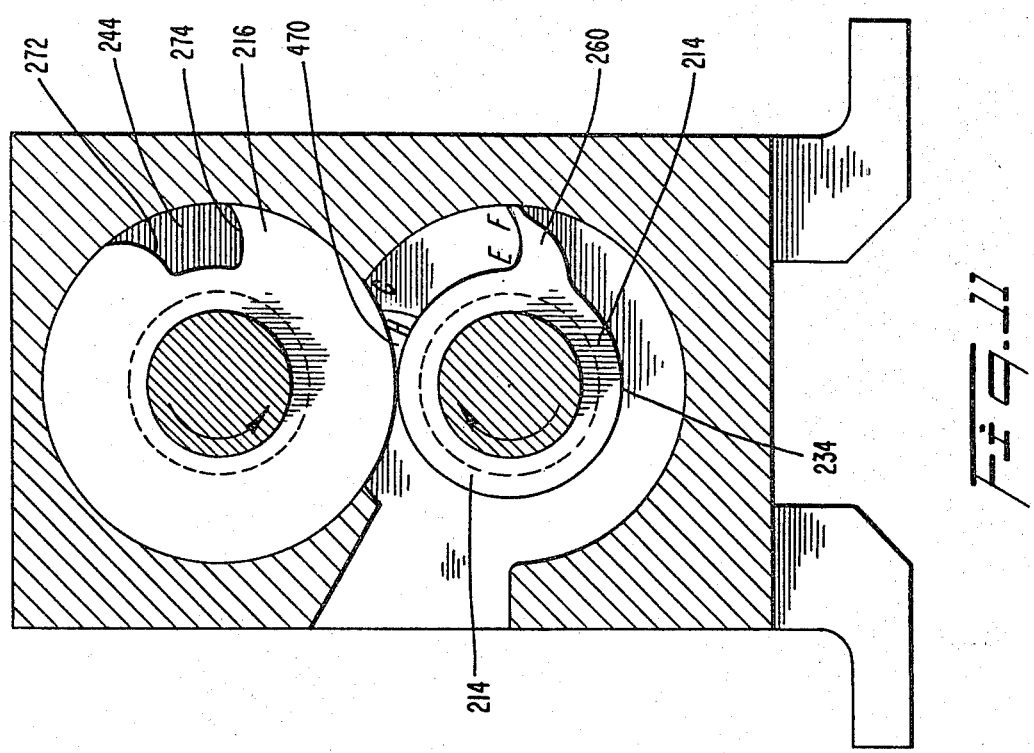
FIGS. 10–14 correspond to the view of FIG. 3A but at different operational positions of the apparatus.
Figure 13:
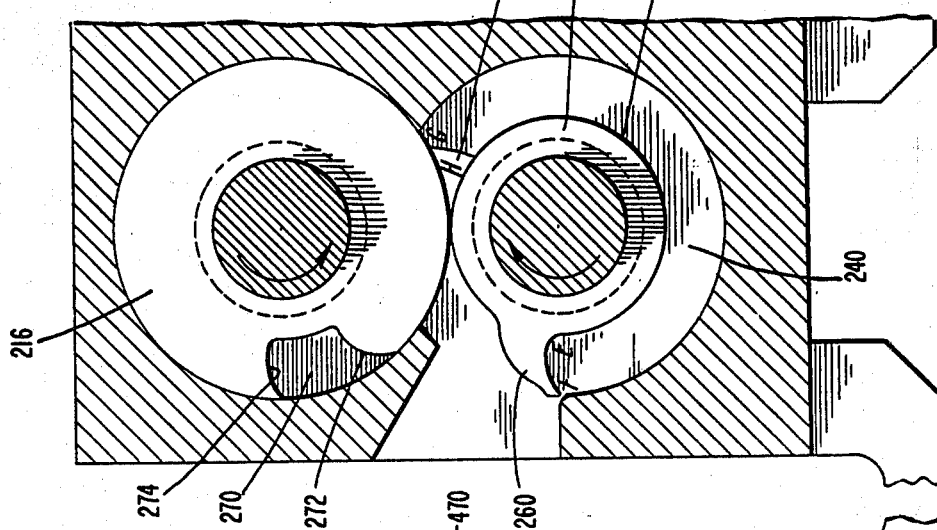
Figure 12:
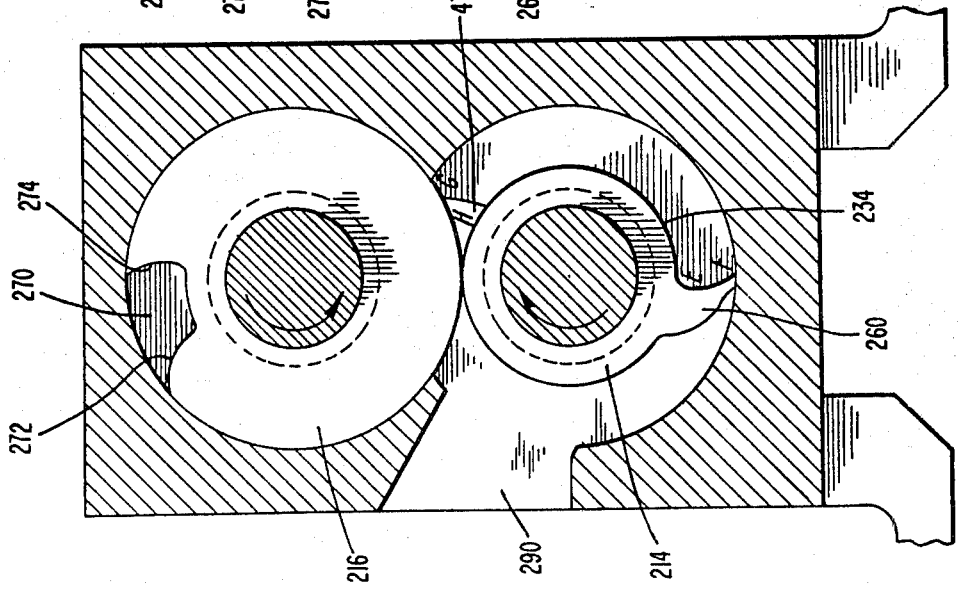

The subsequent flow of the high pressure combustion gases can best be described with reference to FIG. 10. The high pressure combustion gases exit exhaust port 470 into a confined region 288 designated EFGH shown in FIG. 10 and are subsequently expanded in portion 288 of the segmented expander annular region 240 that is confined by the rotating expander vane member 260, that is, EFGH as is shown in FIGS. 11, 12 and 13. When the expander vane member 260 has rotated past the expander exit port 290 and the combustion gases are no longer confined, the combustion gases flow through exit port 290 and conduit 292 to a combustion gas reservoir, which as explained earlier could be the atmosphere if the combustion gases are not to be collected.

Further in accordance with the present invention and as embodied herein, valve means are provided for intermittently interrupting communication between the combustion chamber and the respective segmented annular regions in the compressor and the expander. Turning first to FIG. 17, valve means includes an intake valve 500 having a valve case 502 fixed to the walls of the sub-housing defining the combustion chamber such as by cap 504 removably held in outside plate member 406. A slidable poppet member 506 having a sealing face 508 for abutting an annular valve seat 510 in cap 504 and interrupting the flow of compressed oxidizing gas from intake port 450 to flow path 452 is provided in valve 500. The intake valve poppet member 508 is normally biased to a sealing position by combustion gases trapped in a cavity 512 in valve casing 502 by a check valve such as spring loaded ball valve 514 cooperating with orifice 516 which connects cavity 512 with the combustion chamber region 422. The pressure in cavity 512 acts against a poppet member face 518 which has a smaller surface area than the area of sealing face 508 on which the pressure of the compressed oxidizing gas is incident.

It will be understandable to one of ordinary skill in the art that the dimensions of the poppet member 506 and cavity 512 can be chosen such that when the compressor portion reaches the end of the compression cycle as is approximated by FIG. 8, the pressure against sealing face 508 will cause the poppet member 506 to move axially off of the valve seat 510, thereby allowing passage of the compressed oxidizing gas to flow past the valve seat 510 and through flow path 452 to the combustion chamber region 422. After the compressed oxidizing gas has entered the combustion chamber and the compressor rotors have advanced to positions such as approximately shown in FIG. 4, the pressure on poppet member face 508 drops substantially allowing return axial movement of poppet member 506 into sealing engagement with annular seat 510 thereby closing off combustion chamber 422, 420 and 424 from the compressor segmented annular region 40 and trapping the compressed oxidizing gas in the combustion chamber for subsequent combustion with fuel. One of ordinary skill in the art would realize that other valve types and arrangements would be suitable for intake valve 500 as well as other means for synchronizing the operation of the valve with the operation of the rotary compressor elements.

The valve means as embodied herein further includes an exhaust valve 520 as is shown in FIG. 18. Exhaust valve 520 includes a generally hollow cylindrical casing 522, the interior of which constitutes the boundaries of flow path 480, which case is fixedly attached to the combustion chamber housing such as by cap 524 which is removably attached to outside plate member 406. Exhaust valve 520 further includes apertures 526 formed radially in the cylindrical valve case 522, which apertures constitute the flow path 478.

Exhaust valve 520 further includes a poppet member 528 having a cylindrical part 530 slidably disposed in the bore of cylindrical casing 522 and positioned to slidingly seal off apertures 526 when the poppet member 528 is moved axially to the sealing position as is shown in FIG. 18. The exhaust valve 520 further includes a cavity 532 formed in cap 524 which communicates with combustion chamber portion 424 through conduit 534 formed in cap 524.

As with cavity 512 in intake valve 500, cavity 532 contains a check valve such as ball check valve 536 cooperating with conduit 534 such that the gases in cavity 532 are maintained at an elevated pressure approaching the maximum pressures experienced in the combustion chamber, as will be understood by one of ordinary skill in the art. The pressure of the gases in cavity 532 are exerted against an axial face 538 of the poppet member 528 to bias the poppet member 528 into the sealing position, that is, where the cylindrical portion 530 of poppet member 528 covers the intersections of the apertures 526 with the bore of valve case 522. Poppet valve member 528 has a further cylindrical portion 540 that forms in conjunction with cylindrical part 530 an axially directed annular surface 542. Exhaust valve 520 further includes a conduit 544 formed in cap 524 which connects the combustion chamber portion 424 with the vicinity of annular surface 542. Yet another conduit, conduit 546, connects conduit 544 with the segmented compressor annular region 40 for reasons which will now be explained.

At the start of the combustion process in combustion chamber 420, 422 and 424, the exhaust valve poppet 528 is in the sealing position, as is depicted in FIG. 18. Following the initiation of combustion, the pressure in the combustion chamber rises dramatically and would immediately act on the annular surface 542 to move the poppet member 528 axially out of sealing position were it not for the fact that the pressure in conduit 544 does not immediately approach the pressure in combustion chamber 420 because the gases that normally would flow from the combustion chamber into 544 are ducted through conduit 546 to the segmented compressor annular region 40. One of ordinary skill in the art would realize that conduits 544, 546, and 534 are all for pneumatically controlling the operation of the exhaust valve 520 and that are sized to permit the flow of only relatively miniscule amounts of gas.

As the pressure continues to rise in the combustion chamber 420, 422 and 424, and as shown in FIG. 18, the compressor vane member 60 moves into axial alignment with the intersection of conduit 546 with the segmented compressor annular region 40, approximately the position shown in FIG. 4. In this position the vane 60 blocks flow through conduit 546 and allows the pressure to rise in conduit 544. As can be well understood by one of ordinary skill in the art, the dimensions of annular surface 542 with respect to the surface area of surface 538 can be chosen such that the force acting on the annular surface 542 due to the pressure in conduit 544 when conduit 546 is closed off will move the poppet member 528 axially to the right in FIG. 18, thereby unsealing apertures 526 and allowing flow of the high pressure combustion gases from combustion chamber 420, 422, 424 through flow path 478 and then through flow paths 480 and 482 to the exhaust port 470. Following release of the combustion gases, the pressure in the combustion chamber 420 will drop as will the pressure in conduit 544, thereby allowing the force of the pressure in cavity 532 to return the poppet member 528 to a sealing position. Also, vane member 60 will have moved out of axial alignment with the intersection of conduit 546 and segmented annular region 40, further reducing the pressure in 544.

Following the release of the high pressure combustion gases from combustion chamber 420 past exhaust valve 520 and through exhaust port 470, the expansion of the gases proceeds as has been outlined previously. Namely, the hot combustion gases enter the confined region 288 designated EFGH as is shown in FIG. 10, whereupon the confined volume increases in size, thereby decreasing the pressure of the confined combustion gases, preferably accompanied by the extraction of energy from the hot combustion gases in the form of a net positive torque on expander rotor 214. It will be appreciated that other valve arrangements and modes of synchronization of the exhaust valve 520 with the operation of the compressor and expander units are possible and can be adapted to the present apparatus by those skilled in the art.

Because of the relatively high temperatures of the combustion process of typical fuels, it may be necessary to cool parts of apparatus 10 in order to achieve satisfactory long-term operation. In general, it may be necessary to cool the walls surrounding combustion chamber 420, the walls surrounding the segmented expander annular region 240, and also the expander rotor 214 itself, including expander vane member 260. As is shown in FIGS. 9A and 9B, coolant flow ports 562 and 564 can be provided in plate members 402, 404, and 406 to connect with coolant flow passages (not shown) formed in the respective plate members proximate the inner surface of combustion chamber 420, 422, and 424. The location and sizing of the coolant passages connecting ports 562 and 564 can be determined by one of ordinary skill in the art based on considerations of the materials used for the combustion chamber as well as for expected temperatures of combustion.

Coolant passages (not shown) can also be provided in the walls of housing 12 surrounding segmented expander annular region 240 in a similar fashion. Also, techniques are available and understood by those skilled in the rotating machinery art for forming internal flow passages (not shown) in the rotating shafts themselves and connecting these flow passages with other flow passages (not shown) extending radially outward to vane members. In this way, expander rotor 214 and expander vane member 260 can be cooled if necessary to achieve a long life operation.

It is also apparent from the preceding description of apparatus 10, and with respect to FIG. 10, that the volumetric ratios of compression and expansion can be adjusted one to the other in several ways, the most convenient of which being adjusting the axial thickness of the respective rotor pairs to achieve corresponding adjustments in the axial dimension of the respective segmented annular regions. As is shown in FIG. 1, the axial thickness 572 of compressor rotor 16 (which will be generally equal to the thickness of the compressor rotor 14) is made smaller than the corresponding thickness 574 of expander rotor 216 (the other expander rotor 214 being of aproximately the same thickness as rotor 216). Although apparatus 10 is shown with an expansion ratio larger than the compression ratio as a result of the greater axial thickness of the expander rotors 214 and 216 compared to the thickness of the compressor rotors 14 and 16, it may be advantageous in certain situations to have a larger compression ratio than an expansion ratio.

Similarly, one reading the previous description and in consideration of FIG. 10, would realize that the rotor dimensions R and r of the compressor rotors do not have to be identical to the corresponding rotor dimensions R' and r' of the expander rotors as they are shown in FIG. 1. For rotation on the same parallel shaft arrangement, it is required that the sum of the rotor dimensions be equal, that is, that $R+r=R'+r'$.

Turning now to the alternate cooperating rotor constructions shown in FIGS. 15 and 16, which are designated appartus 610 and 810, respectively, it can be seen that the number of individual vane members positioned on the first rotor can be greater than one and also that more than one first rotor can be placed in cooperation with a single second rotor.

Turning first to the embodiment of the present invention shown in FIG. 15, which shows the compressor section of apparatus 610, a first rotor 614 has two compressor vane members 660a and 660b positioned at diametrically opposite sides of rotor 614. In order to provide the required vane relief means, second rotor 616 has two notches 670a and 670b placed at diametrically opposite positions on rotor 616. Thus, vane member 660b is received in notch 670b cyclically between the cooperation of the other vane member 660a and the other notch 670a. The expander rotors (not shown) of apparatus 610, would have a similar arrangement.

Turning now to the embodiment of the present invention shown in FIG. 16, wherein only the compressor section of the apparatus 810 is shown, two first rotors 814a and 814b are shown cooperating with a single second rotor 816 to form two separate segmented compressor annular regions 840a and 840b, respectively. Each of the first rotors 814a and 814b have a single compressor vane member designated 860a and 860b, respectively, for cooperation with a single notch 870 in second rotor 816. First rotors 814a and 814b are fixed to shafts 822a and 822b for rotation in housing 812. Second rotor 816 is mounted on shaft 824, the axis of which is coplanar with the axes of the separate shafts 822a and 822b. Shafts 822a, 822b and 824 are coupled for dependent rotation such that shafts 822a and 822b turn in like angular directions which are opposite to the angular direction of shaft 824 as indicated by the arrows in FIG. 16.

It will be understood that the expander portion (not shown) of apparatus 810 will also have two first rotors and a single second rotor in cooperating engagement. Also, it will be understood that two separate combustion chambers will be provided in housing 812 to receive separate masses of compressed oxidizing gas admitted from segmented annular regions 840a and 840b. As will still further be understood, each of the first rotors 814a and 814b can include more than one vane member, as shown schematically by the broken line representation of vane members 860c and 860d on rotors 814a and 814b, respectively. In this latter embodiment, a corresponding second notch shown in broken line and designated 870a in FIG. 16 must be provided to receive alternately the additional vane members 860c and 860d. As in the embodiment shown in FIG. 15, the two vane members per first rotor of apparatus 810 will be positioned at diametrically opposite points on the respective rotor and the two notches will also be positioned at diametrically opposite sides of the second rotor. Also, the angular positions of the vane members on first rotor 814a are identical to the positions of the vane members on first rotor 814b.

It will be apparent to those skilled in the art that various additional modifications and variations could be made in the internal combustion engine of the present invention without departing from the scope or the spirit of the invention.

What is claimed is:

1. Apparatus for combusting fuel with a compressible oxidizing gas to produce combustion gases, the apparatus comprising:

compressor means for increasing the pressure of the oxidizing gas, a housing having at least one chamber for combustion situated herein, and further including (i) intake means communicating with said compressor means for admitting to said chamber the compressed oxidizing gas and (ii) exhaust means for releasing combustion gases from said chamber;

expander means communicating with said exhaust means for decreasing the pressure of the combustion gases, wherein at least said expander means includes cooperating rotor means for forming a gas-tight region in the shape of a segment of an annulus, a portion of said region being separately confineable, the volume of said region portion being variable only in the tangential direction, the pressure within said region portion changing when the volume of said region portion is varied;

means for introducing fuel into said combustion chamber for combustion with said compressed oxidizing gas;

wherein the exhaust means further includes exhaust valve means for intermittently releasing combustion gases to the expander means at predetermined intervals during each combustion cycle, said exhaust valve means including a valve member pneumatically moveable alternately into a closed and an open position, said exhaust valve means further including pneumatic control means for initiating movement of said valve member to said open position when said expander rotors are in a predetermined angular position;

wherein said intake means includes an intake valve for admitting the compressed oxidizing gas to the combustion chamber during a second predetermined interval during each combustion cycle, said intake valve including an intake valve member pneumatically moveable alternately into closed and open positions and wherein said compressor means includes means for activating said intake valve means prior to the activation of said exhaust valve means during each combustion cycle;

said compressor means including a pair of cooperating rotors synchronized with said expander rotors, one of said compressor rotors having a vane; wherein said exhaust valve pneumatic control means includes a control channel in flow communication with said compressor means, said communication being interruptable by said vane whereby movement of said valve member to an open position is initiated during each combustion cycle; wherein said intake valve is openable by the gas pressure ahead of said compressor vane and closeable by the gas pressure behind said compressor vane; and wherein said intake valve means and said exhaust valve control channel are positioned adjacent to one another with said intake valve means being located upstream with respect to said exhaust valve control channel in the direction of travel of the vane of said compressor rotor.

2. Improved valve apparatus for internal combustion engines of the type having a combustion chamber with an inlet port and an exhaust port, a compressor in flow communication with the combustion chamber through the intake port and including a pair of cooperating compressor rotors in tangential relation, and an expander in flow communication with the combustion chamber through the exhaust port and including a pair of cooperating expander rotors in tangential relation, the improvement comprising exhaust valve means including
(a) a poppet member having an axis;
(b) a valve housing for mounting said poppet member for reciprocable sliding motion along said axis, said housing having an internal flow path sealable by said poppet member in one axial position for carrying the combustion gases between the combustion chamber and the exhaust port;
(c) means for biasing said poppet member into the sealing axial position, wherein said biasing means includes
 (i) a plunger portion with an axially directed face as an element of said poppet,
 (ii) said valve housing having an axially directed plunger cavity for slidably constraining said plunger portion,
 (iii) a conduit in said valve housing for connecting said plunger cavity with the combustion chamber, and
 (iv) check valve means positioned in said conduit for permitting flow of combustion gases from the combustion chamber to said cavity to act against said plunger portion axial face and to obstruct flow in the reverse direction;
(d) pneumatic means for moving said poppet member axially away from the sealing position when the expander rotors are in a predetermined angular position with respect to the exhaust port, said pneumatic moving means including pneumatic control means for sensing when the expander rotors are in said predetermined position.

3. Apparatus as in claim 2 wherein the combustion chamber is of constant volume.

4. Apparatus as in claim 2 wherein the exhaust port is triangular in shape and positioned with a vertex proximate the convergence of the tangential expander rotors.

5. Apparatus as in claim 2 wherein said check valve means includes a spring-loaded ball valve.

6. Improved valve apparatus for internal combustion engines of the type having a combustion chamber with an inlet port and an exhaust port, a compressor in flow communication with the combustion chamber through the intake port and including a pair of cooperating compressor rotors in tangential relation, and an expander in flow communication with the combustion chamber through the exhaust port and including a pair of cooperating expander rotors in tangential relation, the improvement comprising exhaust valve means including
(a) a poppet member having an axis;
(b) a valve housing for mounting said poppet member for reciprocable sliding motion along said axis, said housing having an internal flow path sealable by said poppet member in one axial position for carrying the combustion gases between the combustion chamber and the exhaust port;
(c) pneumatic means for moving said poppet member axially away from the sealing position when the expander rotors are in a predetermined angular position with respect to the exhaust port, said pneumatic moving means including pneumatic control means for sensing when the expander rotors are in said predetermined position; and
wherein the compressor rotors and the expander rotors are synchronized and wherein said pneumatic moving means includes
 (i) a control portion with an axially directed face as an element of said poppet member,
 (ii) an axially directed cavity in said valve housing for slidably constraining said control portion,
 (iii) a conduit connecting said cavity and the combustion chamber for supplying combustion gases to act against said control portion face, and
 that the pneumatic control means includes a bleed passage in said housing, one end of said bleed passage being flow connected to said conduit between the combustion chamber and said cavity, and the other end of said bleed passage extending to an outer surface of said valve housing proximate one of said compressor and expander rotors and being intermittently coverable by said one rotor to block flow from said other end, whereby upon blockage of said other end of said bleed passage by said one rotor combustion gases flow from the combustion chamber to said cavity to increase the pressure on said poppet control face causing axial motion of said poppet member to unseal said internal flow path, and upon uncovering of said bleed passage other end the combustion gases entering said conduit at the combustion chamber flow through said bleed passage and bypass said cavity.

7. Apparatus as in claim 6 further including means for biasing said poppet member to the sealing position, wherein the area of said control portion face is selected in relation to magnitudes of the force exerted by said biasing means and the combustion gas pressure to provide a net force on said control portion face to unseal said internal flow path when said bleed passage other end is blocked.

8. Apparatus as in claim 6 wherein said one rotor is one of the pair of cooperating compressor rotors.

9. Apparatus as in claim 6 wherein said one rotor includes a vane member and said vane member intermittently covers said bleed passage other end.

10. Improved valve apparatus for internal combustion engines of the type having a combustion chamber with an inlet port and an exhaust port, a compressor in flow communication with the combustion chamber through the intake port and including a pair of cooperating compressor rotors in tangential relation, and an expander in flow communication with the combustion chamber through the exhaust port and including a pair of cooperating expander rotors in tangential relation, the improvement comprising exhaust valve means including (a) a poppet member having an axis;
(b) a valve housing for mounting said poppet member for reciprocable sliding motion along said axis, said housing having an internal flow path sealable by said poppet member in one axial position for carrying the combustion gases between the combustion chamber and the exhaust port; and
(c) pneumatic means for moving said poppet member axially away from the sealing position when the expander rotors are in a predetermined angular position with respect to the exhaust port, said pneumatic moving means including pneumatic control means for sensing when the expander rotors are in said predetermined position, wherein said internal flow path of said valve housing includes a cylindrical bore segment communicating with the exhaust port and an aperture segment communicating with the combustion chamber, and wherein said poppet member includes a cylindrical sleeve portion slidably disposed in said bore in close fitting relation, said aperture being positioned to communicate with said bore in the vicinity of said sleeve portion, said sleeve portion covering said aperture when said poppet member is in the axial sealing position.

11. Apparatus as in claim 6 wherein said valve housing outer surface forms part of an axial wall bounding the region of the compressor swept by the cooperating compressor rotors, said one rotor being one of the pair of compressor rotors.

12. Apparatus as in claim 11 wherein said one compressor rotor has a vane member which intermittently covers said bleed passage other end.

13. Apparatus as in claim 11 wherein said one compressor rotor is mounted on the same shaft as one of the expander rotors to achieve synchronization.

14. Apparatus as in claim 6 further including intake valve means positioned in the flow communication between the intake port and the combustion chamber, the apparatus still further including means for activating said intake valve means to admit a charge of compressed oxidizing gas to the combustion chamber prior to activation of said exhaust valve means by said one rotor to discharge the resultant combustion gases from the combustion chamber.

15. Apparatus as in claim 14 wherein said intake valve means is activated by the pressure level in the compressor; and wherein the compressor pressure level is a function of the angular positions of the compressor rotors.

16. Apparatus as in claim 15 wherein said one rotor is one of the compressor rotors, and said intake valve means is positioned upstream of said bleed passage other end with respect to the direction of rotation of said one compressor rotor.

17. Apparatus as in claim 15 wherein said intake valve means includes (1) a second poppet member having a second axis,
(2) a second valve housing for mounting said second poppet member for reciprocable sliding motion along said second axis, said second housing having a second internal flow path sealable by said second poppet member in one axial position for carrying compressed oxidizing gas between the intake port and the combustion chamber, and
(3) second biasing means for biasing said second poppet member to the sealing axial position.

* * * * *